United States Patent [19]

Sonehara et al.

[11] Patent Number: 5,075,798
[45] Date of Patent: Dec. 24, 1991

[54] PROJECTION-TYPE DISPLAY DEVICE

[75] Inventors: Tomio Sonehara; Shuji Aruga; Shinji Morozumi, all of Suwa, Japan

[73] Assignee: Seiko Epson Corporation, Tokyo, Japan

[21] Appl. No.: 424,025

[22] Filed: Oct. 19, 1989

Related U.S. Application Data

[62] Division of Ser. No. 786,438, Oct. 11, 1985, abandoned.

[30] Foreign Application Priority Data

Oct. 22, 1984 [JP] Japan .................................. 59-221556
Jul. 31, 1985 [JP] Japan .................................. 60-169442

[51] Int. Cl.$^5$ .......................... G02F 1/13; G02B 27/28
[52] U.S. Cl. ........................................ 359/490; 359/63; 358/61; 353/31; 353/34
[58] Field of Search ........... 350/172, 173, 174, 331 R, 350/337, 347 e, 397; 358/60, 61; 353/31, 34

[56] References Cited

U.S. PATENT DOCUMENTS

| | | | |
|---|---|---|---|
| 3,840,695 | 10/1974 | Fischer | 358/61 |
| 4,191,456 | 3/1980 | Hong et al. | 350/173 |
| 4,425,028 | 1/1984 | Gagnon et al. | 350/337 |
| 4,461,542 | 7/1984 | Gagnon | 350/331 R |
| 4,500,172 | 2/1985 | Gagnon et al. | 350/408 |
| 4,506,956 | 3/1985 | Dir | 350/349 |
| 4,544,237 | 10/1985 | Gagnon | 350/331 R |
| 4,650,286 | 3/1987 | Koda et al. | 350/408 |
| 4,715,684 | 12/1987 | Gagnon | 350/331 R |
| 4,836,649 | 6/1989 | Ledebuhr et al. | 350/174 |

OTHER PUBLICATIONS

Gooch et al., "Optical Characteristics of Twisted Nematic Liquid-Crystal Films"; *Electronics Letters*, vol. 10, No. 1, Jan. 10, 1974; pp. 2-4.

Jacobson, et al.; "A New Color-TV Projector", pp. 106-07; SID 77 Digest.

*Primary Examiner*—Bruce Y. Arnold
*Assistant Examiner*—David R. Parsons
*Attorney, Agent, or Firm*—Blum Kaplan

[57] ABSTRACT

A projection-type display device having a single light source which produces light. A first dichroic mirror group receives the light and separates it into colored light. A transmissive light valve system modulates the colored light and a second dichroic mirror group synthesizaes the modulated colored light. A projection system projects the synthesized colored light onto a screen.

13 Claims, 5 Drawing Sheets

PROJECTION-TYPE DISPLAY DEVICE

This is a division of application Ser. No. 06/786,438, filed Oct. 11, 1985, now abandoned.

BACKGROUND OF THE INVENTION

The present invention generally relates to a projection-type color display device and, in particular, to a projection-type color display device which uses a plurality of light valves for forming picture images.

There are several versions of projection-type color display devices which utilized a light valve. For example, U.S. Pat. Nos. 4,461,542 and 4,425,028 disclose a color display device in which a reflecting light valve and dichroic mirrors synthesize and project monochromatic pictures. A color display device which uses an oil-membrane light valve is disclosed in an article entitled "Matrix-Addressed Liquid Crystal Projection Display" published in the 1972 *Society for Information Display* (SID) at pp. 62–63, and in an article entitled "Recent Advances in the single-Gun Color Television Light-Valve System" published in the 1975 SID at pp. 24–27. An article on the relevant technology entitled "Optical Properties of a Liquid-Crystal Image Transducer at Normal Incidence: Mathematical Analysis and Application to the Off-State" can be found in J.Opt.Soc.Am., Vol 70, No. 3, March 1980 beginning at page 287.

The conventional projection-type color display devices have several deficiencies. In a device using a reflecting light valve: first, the reflected light at the surface of the light valve causes deterioration of the contrast of the displayed images; second, since the light valve is addressed by the light from a cathode ray tube (CRT), the device inevitably becomes large and complex, and; third, there is the requirement for an excellent polarized light dividing characteristic as well as a colored light dividing characteristic of the dichroic mirror.

In the second device using an oil-membrane light valve, the device is large, complex and expensive and is less than satisfactory with respect to its life span and utilizing efficiency of the light.

Accordingly, the present invention was developed to eliminate the problems in the prior art as described above and to provide a small-sized projection-type color display device which is excellent in the contrast of the displayed pictures and in the utilizing efficiency of the light from the light source.

SUMMARY OF THE INVENTION

Generally speaking, in accordance with the present invention, a projection-type display device is provided. The display device includes a first dichroic mirror group which divides light from a light source into a transmitted light and a relected light according to the wavelength thereof. The device also includes transmissive light valves which develop the picture images and which modulates the divided light flux, a second dichroic mirror group for synthesizing the light flux transmitted through the light valve and a projection optical system for projecting the synthesized light flux.

The light length selecting characteristic of the first and second dichroic mirror groups may be almost equal so that the light flux separated by the first dichroic mirror group is synthesized by the second dichroic mirror group in the present invention. Moreover, each of the first and the second dichroic mirror groups may consist of a plurality of mirrors which effect segregation and synthesis of the primary colors of red, blue and green.

The first and the second dichroic mirror groups may also have a different wavelength selecting characteristic from each other and may be arranged in a cross in one common plane. Moreover, in accordance with the present invention, the transmissive light valves may have a maximum extinction ratio with respect to the main wavelength of the colored light passing therethrough. Furthermore, the ray transmitting direction of the light valves for the passing colored light may be inclined with respect to the normal line of the surface plane of the light valve, thereby most effectively utilizing the incident light angle dependency of the extinction ratio.

Accordingly, it is an object of the present invention to provide an improved projection-type display device.

Another object of the present invention to provide a projection-type display device which utilizes the properties of a light valve to project images.

Yet another object of the present invention is to provide a projection-type display device which is small in size.

A further object of the present invention is to provide a projection-type color display device which provides an excellent contrast in the pictures displayed.

A still further object of the present invention is to provide a projection-type color display device which has an excellent utilizing efficiency of the light produced by the light source.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description take in connection with the accompanying drawings, in which.

DESCRIPTION OF THE PREFERRED EMBODIMENTS

The principle of the function of the present invention is first described. Thereafter, specific embodiments will be described with reference to the drawings.

Light emitted from a light source is segregated into a plurality of colored lights by a first dichroic mirror group. Thereafter, a transmissive light valve corresponding to the colored light develops a picture image and the colored lights are picturemodulated. The transmissive light valve removes the bad influence of the reflected light at the surface of the light valve which is unavoidable in the case using a reflection light valve. Accordingly, the transmissive light valve improves the contrast of the displayed pictures.

Furthermore, the picture display panel driven by the electro-optical effect realizes a motion picture image. The electro-optical material such as liquid crystal, PLZT and the like can be used in the light valve. In any case, compared with the reflection light valve in which the image is written by a light beam from a CRT, and an oil-membrane light valve, the use of the transmissive light valve which is thin and small provides more freedom of construction of the display device and makes it possible to obtain a small display device.

The picture-modulated colored lights are synthesized by a second dichroic mirror group. The second dichroic mirror group may be of the same wavelength selecting characteristic as the first dichroic mirror group, so that the second dichroic mirror group synthesizes the separated colored lights reversibly.

For example, for the first dichroic mirror group for separating a white color light into red, green and blue lights, the corresponding second dichroic mirror group has a red, green and blue light segregating characteristic almost equal to that of the first dichroic mirror group and synthesises the red, green and blue colored lights including the picture information of the corresponding color (hereinafter referred to as the colored picture lights) reversibly. If all of the used light valves are transmissive, the synthesized light is the same color as the light from the light source. In the present invention, the only necessary ability of the dichroic mirror is to segregate the light into the colored lights. The ability to separate the polarized light component, which is required in the prior art, is not necessary in the present invention.

As described above, since the light from the light source is separated into colored lights and the separated colored lights are modulated and synthesized, there is no need to provide a plurality of light sources corresponding to the light of each color. One single light source is sufficient for use in the present invention.

Next, the synthesized colored picture light is focused into an image through a projection lens onto a screen. Since a plurality of colored lights are synthesized, the picture corresponding to each color must be accurately positioned. For example, in the case of a full-color display using the primary colors of red, green and blue, pictures of each primary color are synthesized while insuring good convergence.

By arranging the first and the second dichroic mirror groups having the different colored light dividing characteristics with each other in a cross arrangement, the length of the light which passes between the light source and the light valve, and between the light valve to the projecting optical system, are shortened. Also, by providing the dichroic mirror groups in one common plane, a thin and small-sized projection-type device is obtained.

In the present invention, the transmissive light valve may have a wavelength dependency of the extinction ratio which coincides with the main wavelength of the colored light passing therethrough. This improves the contrast of the picture images obtained by synthesizing and projecting the colored light through the light valve. For example, where using the twisted nematic liquid crystal mode (hereinafter referred to as "TN liquid crystal mode"), the peak of the wavelength-light transmittance curve due to the retardance thereof is made to coincide with the main wavelength of each colored light. As another example, where using the guest-host liquid crystal mode, the peak of the dichroism ratio of the dichroic pigment is made to coincide with the main wavelength of each colored light.

Table 1 shows the wavelength dependency of the mode of the light valve. In this invention, the light valve may be constructed so that the parameters such as thickness and pigment used are changed such that the main wavelength of each colored light is appropriate for the wavelength dependency indicated in Table 1.

TABLE 1

Figure 7:
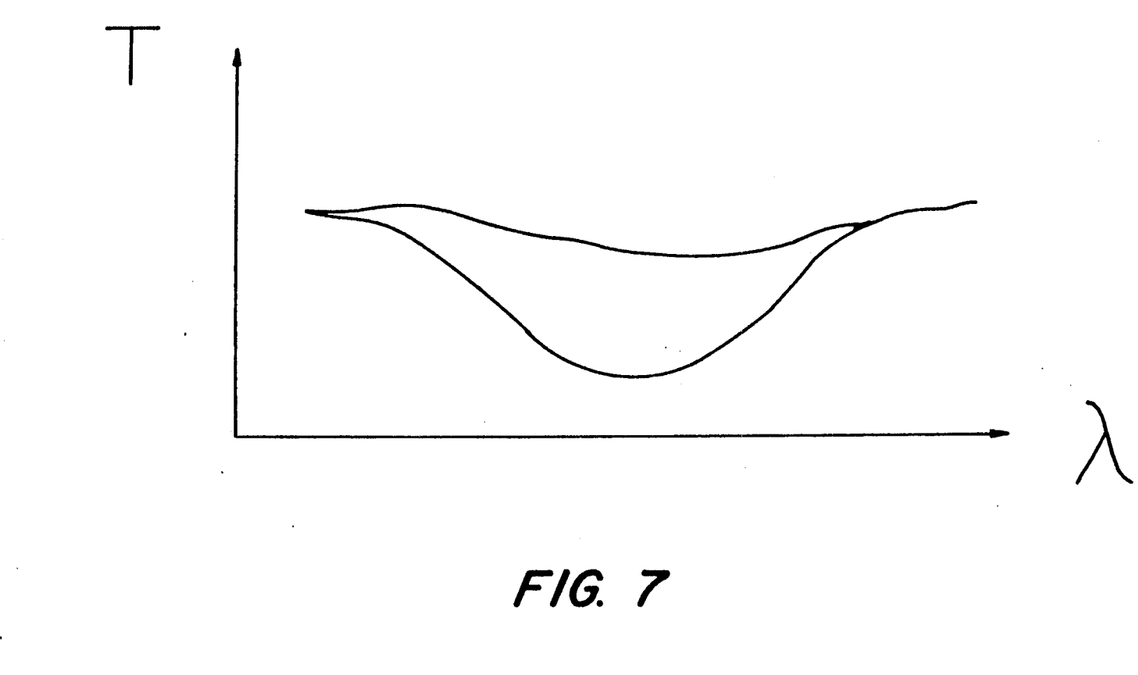
FIG. 7 is a graph depicting the wavelength dependency in the guest-host mode.

| Light Valve Mode | Wave Length Dependency |
| --- | --- |
| TN Liquid Crystal Mode | Birefringence of Liquid Crystal ($\Delta n$) $$T = \frac{\sin^2\left[\frac{\pi}{2}(1+u^2)^{\frac{1}{2}}\right]}{1+u^2}$$ (Parallel Nicol) $$u = \frac{2 \cdot \Delta n \cdot d}{\lambda}$$ T: transmittance $\lambda$: wave length d: thickness |
| Birefringence Mode | Birefringence of Material ($\Delta n$) $$T = K\sin^2\left(\frac{\pi \cdot \Delta n \cdot d}{\lambda}\right)$$ K: constant |
| Guest-Host Mode | Absorption Characteristic of Dichroic Pigment See FIG. 7. |
| Color Polarizer TN Liquid Crystal Mode | Polarizing-Wave Length Characteristic of Color Polarizer |

Furthermore, in the present invention, the transmissive light valve may have a ray transmitting direction of the colored light passing therethrough which inclines by an angle of between 0° to 45° with respect to the normal line of the surface plane of the light valve. Namely, the light valve surface may be inclined so as to increase the extinction ratio in view of the incident light angle dependency of the extinction ratio of the transmissive light valve. Examples of the light valve modes having the incident light angle dependency are the TN liquid crystal mode, the guest-host mode and birefringence mode in Table 1.

Figure 1:
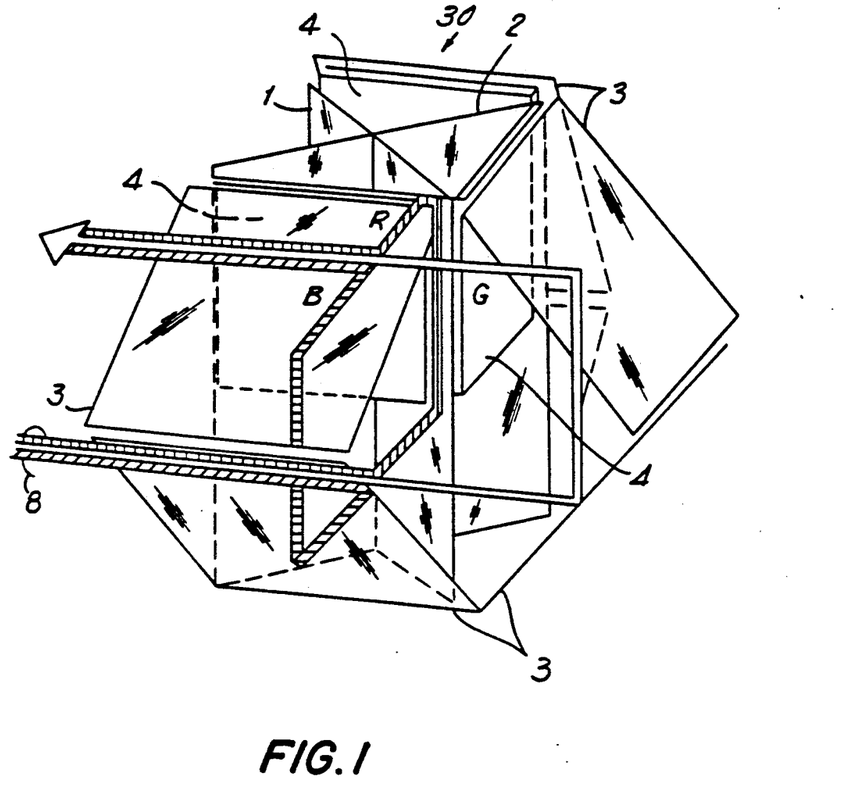
FIG. 1 is a diagramatic representation of an illuminating system of a full-color projection-type display device constructed in accordance with the present invention.

The present invention is now explained in detail with reference to the drawings. Reference is first made to FIG. 1 which depicts an illuminating structure generally indicated at 30 of a full-color projection-type display device, constructed in accordance with the present invention. In FIG. 1, a dichroic mirror group for reflecting blue light (B mirror) 1 and a dichroic mirror group for reflecting red light (R mirror) 2 are arranged in a cross arrangement for performing the segregation and the synthesis of an incident light flux 8. Mirror 3 changes the direction of the light flux, and a transmissive light valve 4 develops the picture images corresponding to red, green and blue. In this embodiment, the liquid crystal panel of the active-matrix (such as a thin film transistor (TFT) matrix) driving method is used as the light valve 4.

Figure 2:
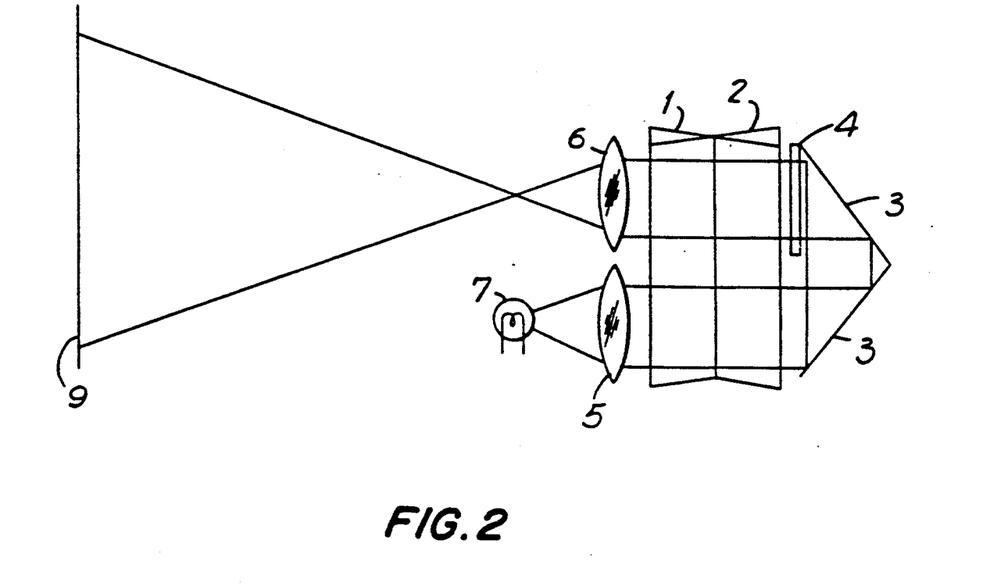
FIG. 2 is a schematic diagram depicting the structure of a projection-type display device in which the illuminating system of FIG. 1 is utilized.

Reference is now also made to FIG. 2 in which a display device generally indicated at 40 including the projection optical system of FIG. 1 is schematically depicted. FIG. 2 shows only a green light beam segregation for simplification. As an illuminating system, Kohler illumination, a critical illumination, a telecentric illumination or the like may be used. The system includes a condenser lens 5, a projection lens 6, a light source 7 and a screen 9.

The principle of the device in accordance with the present invention is explained with reference to FIGS. 1 and 2. As shown, light source 7 (for example, a halogen lamp) emits a white light which is condensed by condenser lens 5. White light 8 which enters into dichroic mirror groups 1 and 2 are separated into the red (R), green (G) and blue (B) lights, the direction of which is changed by mirror 3 and the colored lights enter into transmissive light valve 4. The surface of light valve 4 is dereflection-coated so as to effecitvely transmit the incident light.

Light valve 4 is positioned so that the images are focused through projection lens 6 onto screen 9 and develops the picture images corresponding to each colored light. In this embodiment, the video signals of red, green and blue (shown as 18 in the circuit of FIG. 6) are delivered to each liquid crystal panel to form the monochromatic dynamic picture images.

In the present embodiment, a liquid crystal panel of the TN liquid crystal mode is used. According to the wavelength dependency as shown in Table 1 above, the nematic liquid crystal material of $\Delta n = 0.15$ is used and the thicknesses of the liquid crystal layers of the red, green and blue light valves are defined to 8.4 $\mu$m, 7.1 $\mu$m and 5.8 $\mu$m, respectively, to make the main wavelength of each colored light coincide with the second peak of the wavelength-light transmittance characteristic of the liquid crystal material. Herein, the thickness of each liquid crystal layer is defined by taking into account the constant temperature after the projection light is applied to the panel.

Figure 3:
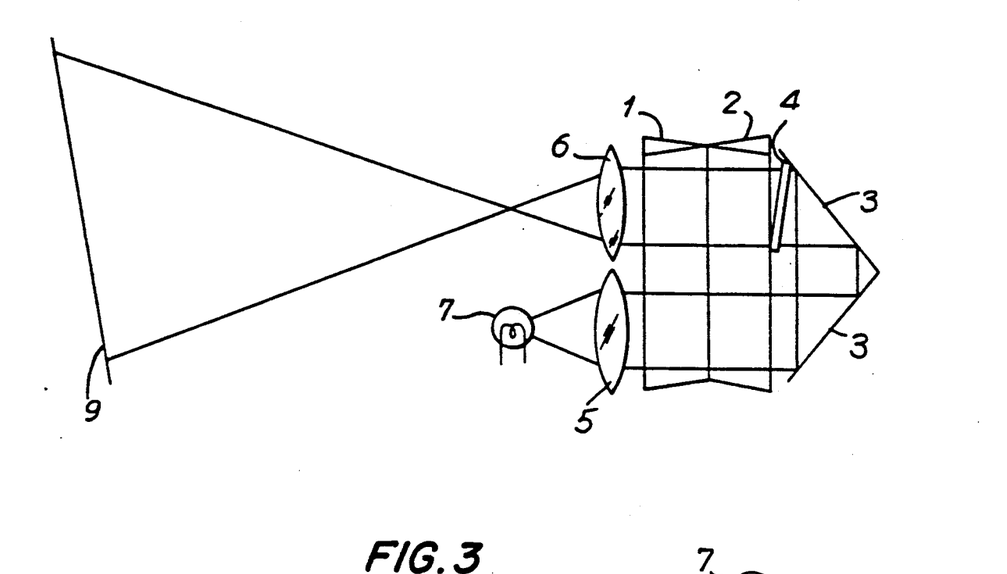
FIG. 3 is a schematic diagram similar to FIG. 2 in which an inclined light valve is utilized.

Since the TN liquid crystal mode presents the incident light angle dependency of the extinction ratio, it is effective to provide the light valve so that the direction of the incident light inclines with respect to the normal line to the surface plane of the light valve. However, in such a case as this, as the light deviates from the optical axis of the projecting lens, the images may be focused on the position which deviates from the optical axis and focused in a trapezoidal shape. The angle of the inclination of the light valve is determined according to the physical properties and the focusing range of the projecting lens. For the liquid crystal panel of the TN liquid crystal mode used in this embodiment, the practical angle by which the light valve is inclined should be between 0° and 30°. Such an arrangement is shown in FIG. 3.

Figure 6:
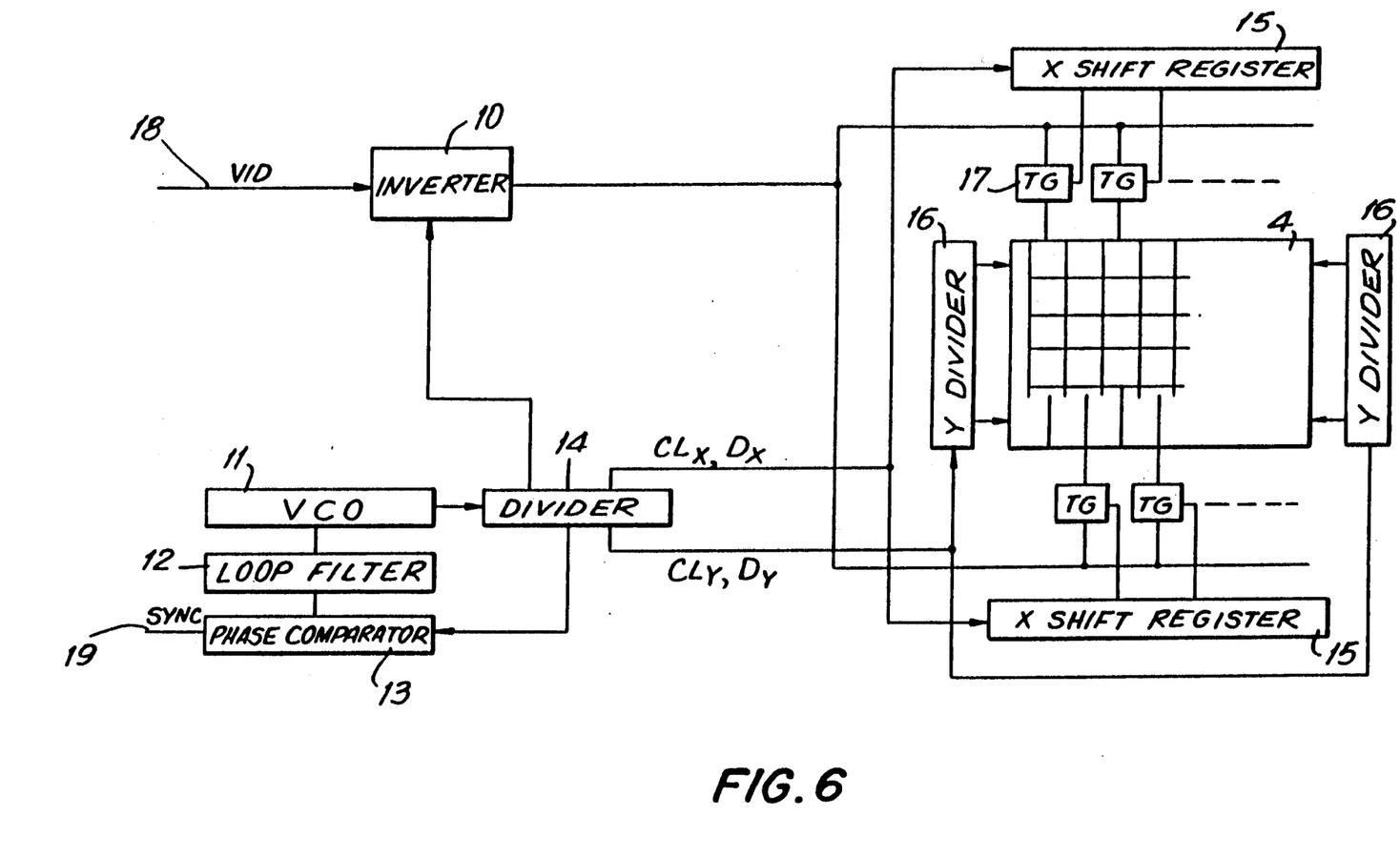

Reference is now made to FIG. 6 which will be used to explain the driving method of the TFT liquid crystal panel used as transmissive light valve 4 in FIG. 2.

Since alternating current driving is required for the liquid crystal panel, the phase of the video signal 18 is inverted in every other field (F) by a polarity inverter circuit 10. A synchronizing controller circuit consists of a voltage controlled oscillator (VCO) 11, a loop filter 12, a phase comparater 13 and a divider 14, and produces clock and data signals X and Y and the onefield (1F) signal.

An X-side shift register 15, a transmission gate 17 for delivering the video signals to each picture element and a Y-side shift register 16 are coupled to liquid crystal panel 4. The X-side and the Y-side shift registers address the thin film transistors in the row direction and the column direction, respectively.

By such a structure as above, the picture element voltage corresponding to the video signal is applied to the TFT liquid crystal picture element to realize the picture display. The details of the driving method and the liquid crystal panel utilized are in accordance with the disclosure of Nikkei Electronics No. 351, 1984, p 221 and SID '83 Digest, p 156, which are incorporated by reference herein as though fully set forth.

The liquid crystal panels of each color are positioned so that the displayed pictures coincide on the screen. When the primary colors of red, green and blue are synthesized and the full-color display is to be effected, misconvergence causes color aberration and a colorghost. Especially when using the matrix panel, the positions of the panels should be determined in a scale less than the pitch between the picture elements which make up such panels in a liquid crystal panel. The "pitch" is the fixed distance between adjacent picture elements. Hence, the positioning of each of the liquid crystal panels should be adjusted with respect to one another so that color images from each picture element in each of the panels are superimposed on or synthesized with one another equal to or less than the distance equivalent to the pitch between adjacent picture elements. When the pitch between the picture elements of each color is set, by regularly shifting each panel about a distance equal to a half pitch of the picture elements, the resolution of the panel is enhanced more than the monochromatic panel.

As is apparent from FIG. 1, the R panel image and the B panel image are in the relation of mirror images with respect to the G panel image.

In the present invention, the dichroic mirror only has to function to segregate and synthesize the colored light. However, the reflected light on the dielectric material thin film always includes the polarizing effect. Namely, in FIG. 1, the red and the blue lights contain more vertically polarized components and the green light contains more horizontally polarized components. Accordingly, in the electro-optical effect mode using a polarizer, it is sometimes necessary to adjust the direction of the polarizer. For example, in case where TN (nematic liquid crystal twisted by 90°) liquid crystal display mode is used, in order to use the light flux most efficiently, the polarizers should be arranged so that the transmission axes of the polarizers on the side of the entry of light of the R panel and the B panel are vertical and the transmission axis of the polarizers on the side of the entry of light of the G panel is horizontal in FIG. 1.

Moreover, by determining the direction of the polarizers, the white balance, that is, the strength of each color is adjusted.

The colored light picture-modulated by the transmissive light valve again enters into the dichroic mirror group and the red and green and blue lights are reversibly synthesized. Finally, the red and green and blue lights are projected and focused in an image on the screen 9 as shown in FIGS. 1 and 2.

Figure 4:
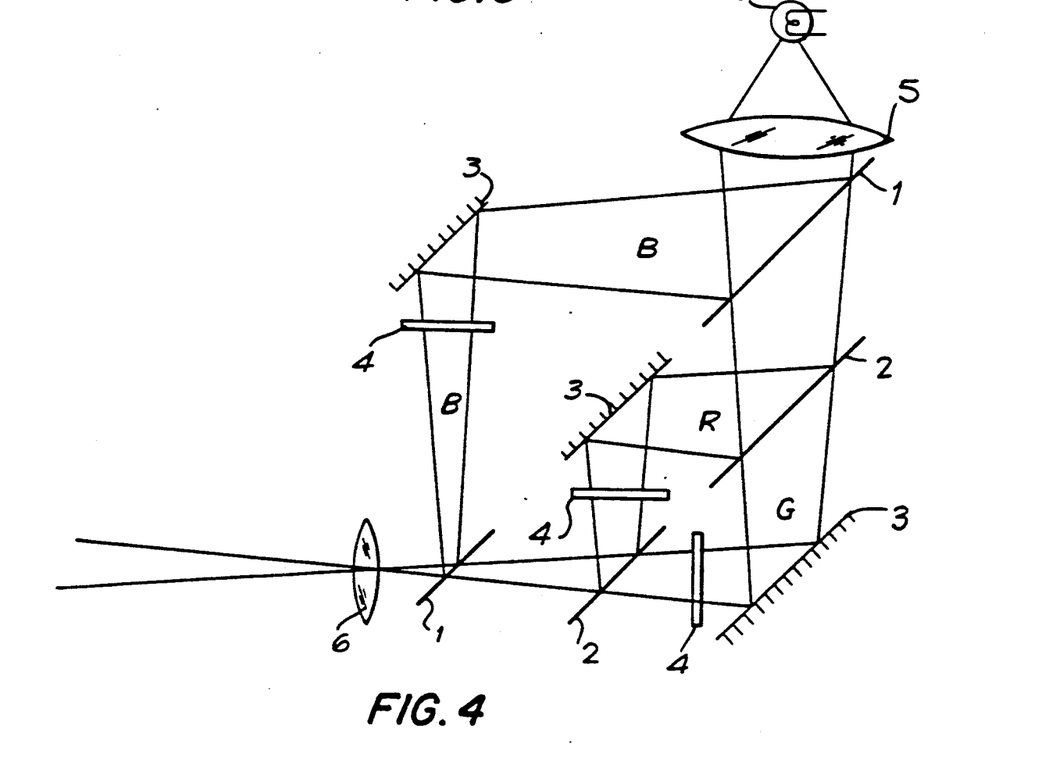
FIG. 4 is a schematic diagram which depicts the planearrangement structure of the display device constructed in accordance with an alternative embodiment of the present invention.
Figure 5:
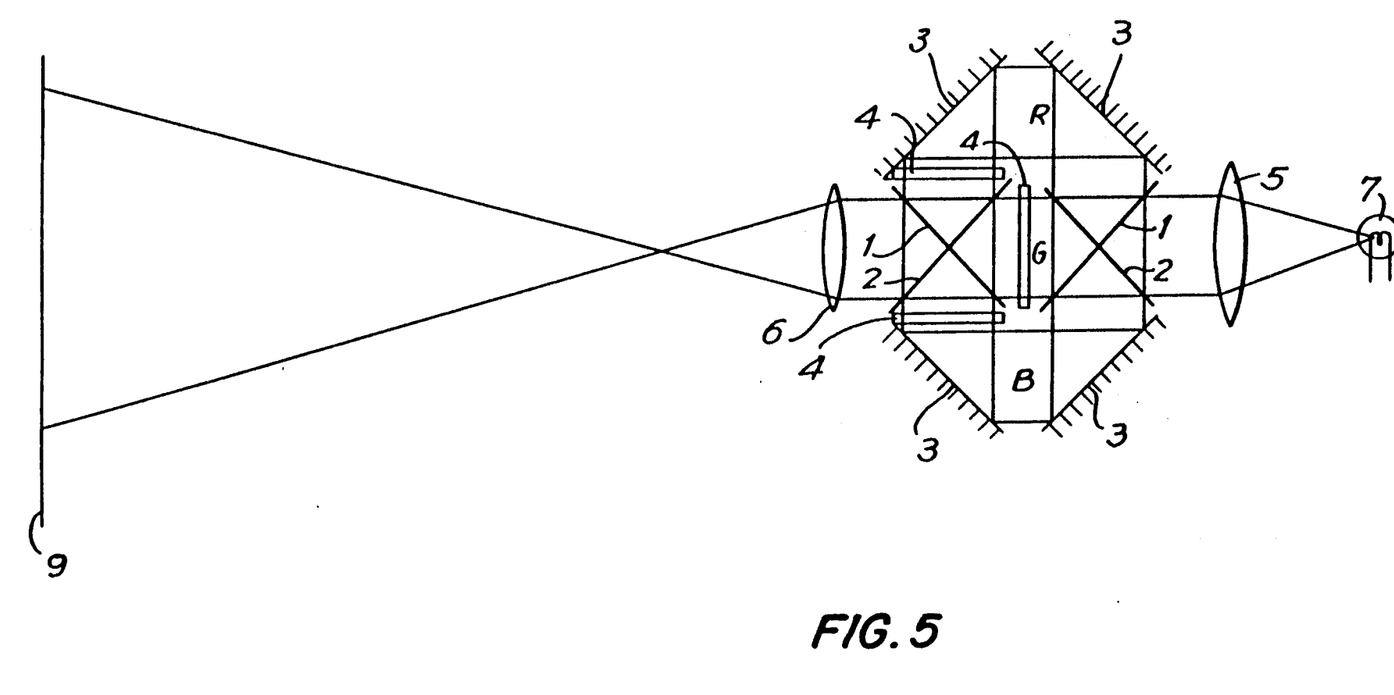
FIG. 5 is a schematic view which illustrates a cross dichroic mirror plane-arrangement structure of a display device constructed in accordance with another alternative embodiment of the present invention; and, FIG. 6 is a schematic circuit diagram for explaining the driving method of the light valve used in the present invention.

The arrangement of the dichroic mirror group is not limited to the one shown by FIG. 1. Other construction examples are shown in FIGS. 4 and 5. In the arrangements of FIGS. 4 and 5, the optical centers of the optical elements including the dichroic mirror groups, light valves and the projecting optical system are positioned in one common plane, such that the principal light rays passing through the optical elements are located in a common plane, thereby providing thinner devices than the arrangement of FIG. 1.

The arrangement of. FIG. 4 is simple in which there is no need to provide the dichroic mirror groups 1 and 2 in a cross. Moreover, mirror 3 for refracting the colored light is also provided on the same plane as the dichroic mirror groups. As in FIG. 1, the system includes a condenser lens 5, a light valve 4 and a projecting lens 6.

FIG. 5 shows an example in which the cross-arranged dichroic mirror groups are provided in a plane. The feature of the arrangement of FIG. 5 is the length of the optical path between light valve 4 and light source 7 and condenser lens 5 is different with respect to each of the red, the blue and the green lights. Furthermore, because the red light and the blue light contain more components which are polarized vertically with respect to the paper surface, the reflection efficiency at mirror 3 for changing the direction of the light is improved.

Light valves 4 corresponding to each colored light in FIGS. 4 and 5 are positioned, similarly to FIG. 1, so that the light valves for all colors are at the focusing position which is at the optically equal distance from projecting lens 6.

As shown by FIGS. 2, 3, 4 and 5, in accordance with the present invention, only a single projecting lens is required and there is no need to adjust the convergence between the picture images of each color when changing the projecting magnification or projecting distance.

In the above description, the TN liquid crystal panel using TFT is used as the transmissive light valve, for example. However, the light valve modes shown in Table 1 can of course be used. Moreover, other light valve modes than those in Table 1 such as the switching phenomenon from a scattering state to a transparent state (the dymanic scattering mode of liquid crystal, etc.), the storing display mode of the liquid crystal and the like may also be applied. Furthermore, the applicable material is not limited to a liquid crystal material, but as long as the material is transmissive, other materials such as of the electro-optical effect of the light-transmissive ceramic including PLZT, electrochromic, electrophoretic and the like may also be used.

Also, in the above embodiment, the primary colors of red, green and blue are separately synthesized. However, other numbers of colors such as 2, or more than 3, are acceptable.

As explained, by using the dichroic mirror groups having a wavelength selecting characteristic which is almost the same as that of the transmissive light valve, the deterioration of the contrast of the display and the color reproductivity caused by the reflected light are avoided and a small-sized projection-type display device is provided in accordance with this invention. Moreover, because of the excellent colored light separating ability of the dichroic mirrors, the projection of the images is realized by a single light source and the light flux is utilized very efficiently. In addition, since one single projection lens is sufficient, the magnification is easily varied. The device of the present invention is further advantageous in that the life of the device is considerably longer without requiring maintenance compared with the conventional high-light flux projecting display device. Also, by sufficiently utilizing the extinction property of the light valve, the pictures of the high contrast and excellent color reproductivity are displayed.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A projection-type display device comprising a light source for producing light, color segregating means for receiving said light and segregating said light into at least two different colored lights, color image generating means having at least first and second transmissive light valves each of which receives one of said colored lights and generates color images in response thereto, each of said transmissive light valves having predetermined wavelength dependency characteristics of the extinction ratio, at lest one of said wavelength dependency characteristics of the extinction ratio of said first transmissive light valve being different than a corresponding wavelength dependency characteristic of the extinction ratio of said second transmissive light valve, color synthesizing means for synthesizing said color images and projection means for projecting said synthesized color images.

2. The projection-type display device as claimed in claim 1, wherein each said colored light has a primary wavelength, each said transmissive light valve having a maximum extinction ratio with respect to the primary wavelength of colored light passing therethrough.

3. The projection-type display device as claimed in claim 1, wherein each said light valve is a transmissive liquid crystal panel, each said liquid crystal panel having a thickness which is different from the thickness of the other liquid crystal panels.

4. The projection-type display device as claimed in claim 3, wherein each said liquid crystal panel has the same birefrigence $\Delta n$, the thickness of each liquid crystal panel being selected so that each liquid crystal panel has a maximum extinction ratio with respect to the primary wavelength of colored light passing therethrough.

5. The projection-type display device as claimed in claim 1, wherein each said light valve is a transmissive liquid crystal panel including a liquid crystal material having at least first and second peaks of a wavelength-light transmittance characteristic, the thickness of each said liquid crystal panel being selected to coincide with the second peak of the wavelength-light transmittance characteristic of the liquid crystal material therein.

6. The projection-type display device as claimed in claim 1, wherein each said light valve is a transmissive liquid crystal panel, said light source heating said panels to a constant temperature, the selected thickness of each said panel being dependent on said constant temperature.

7. The projection-type display device as claimed in claim 1, wherein each said light valve is a transmissive liquid crystal panel, each said panel including a plurality of picture elements arranged in a matrix array.

8. The projection-type display device as claimed in claim 7, wherein each said picture element is selectively actuated by an active element.

9. The projection-type display device as claimed in claim 7, wherein the pitch of said picture elements is equal in each said light valve.

10. The projection-type display device as claimed in claim 9, wherein the position of each said light valve is determined in a scale less than or equal to the pitch of the picture elements.

11. The projection-type display device as claimed in claim 10, wherein each light valve is positioned with respect to one another at a distance equal to about one-half pitch of the picture elements.

12. The projection-type display device as claimed in claim 1, further including drive means for producing a video signal for driving said light valves, said drive means including polarity invertor circuit means for selectively inverting the phase of the video signal.

13. The projection-type display device as claimed in claim 1, wherein each said colored light has a ray transmitting direction, the ray transmitting direction of the colored light for each light valve being inclined with respect to the normal line of the surface plane of each said light valve.

* * * * *